United States Patent [19]

Bose

[11] Patent Number: 4,943,887
[45] Date of Patent: Jul. 24, 1990

[54] FREQUENCY-DEPENDENT OVERVOLTAGE PROTECTIVE DEVICE FOR HIGH VOLTAGE APPLIANCES

[75] Inventor: Ajit K. Bose, Nijmegen, Netherlands

[73] Assignee: Smit Transformation B.V.

[21] Appl. No.: 196,564

[22] Filed: May 20, 1988

[30] Foreign Application Priority Data

May 22, 1987 [NL] Netherlands ............... 8701238

[51] Int. Cl.⁵ .......................................... H02H 9/04
[52] U.S. Cl. ................................. 361/56; 361/11;
361/58; 361/111; 363/50
[58] Field of Search ..................... 363/50, 52–54;
361/10, 11, 56, 58, 91, 111

[56] References Cited

U.S. PATENT DOCUMENTS

| | | | |
|---|---|---|---|
| 4,563,720 | 1/1986 | Clark | 361/111 |
| 4,584,622 | 4/1986 | Crosby et al. | 361/111 |
| 4,587,588 | 5/1986 | Goldstein | 361/58 |
| 4,739,436 | 4/1988 | Stefani et al. | 363/50 |
| 4,760,485 | 7/1988 | Ari et al. | 361/111 |

Primary Examiner—Peter S. Wong

[57] ABSTRACT

An asymmetrical overvoltage protection circuit includes a series connection of varistors with a capacitance in parallel with only one of the varistors. The asymmetry may also involve a parallel connection of an inductance with the other of the varistors.

20 Claims, 2 Drawing Sheets

FREQUENCY-DEPENDENT OVERVOLTAGE PROTECTIVE DEVICE FOR HIGH VOLTAGE APPLIANCES

The current invention relates to a device for protecting an electrical apparatus against overvoltage.

Such devices are generally known.

Such a known device has a virtually fixed safety voltage level so that the protective device, which is generally connected in parallel to the appliance to be protected, will respond when the supplied voltage exceeds the safety voltage level of the protective device. When the safety voltage level of the protective device is selected so as to be marginally lower than the maximum permissible voltages of the appliance being protected during operating conditions the apparatus to be protected is sufficiently protected against the high voltages occurring most often in networks. These result from the use of switches or the occurrence of lightning strikes. The test voltages of the appliance for protection (for example a transformer) generally satisfy national and international norms, which are higher than the maximum permissible voltage of the network in which the appliance is used.

It has been found in practice that, in spite of this at first sight apparently sufficient protection, appliances protected in this way can nevertheless be affected by internal overvoltage phenomena which can result in malfunctioning.

Research has shown that as a result of resonance (such an appliance is often furnished with reactive and capacitative components), locally the tested voltage level can be exceeded while the voltage level at the terminals of the appliance and at the terminals of the protective device still lie under the safety level. It has also been found from this research that such resonance voltages usually have high frequencies.

To protect electrical appliances against such phenomena US-A-4.095.163 shows a protection apparatus, in which the protection voltage level thereof is frequency dependant by virtue of the series connection of a capacitor and an element with a voltage dependant impedance.

As a result of the application of such frequency-dependent protection whereby the safety voltage level of the protective device is lowered in the frequency areas, whereby resonance occurs, it is possible to prevent internal voltages developing in the appliance as a result of resonance being able to reach values which may damage the appliance.

It is hereby noted that the resonant frequencies of such phenomena, even of the same appliance, are not constant; they depend among other factors upon the magnetic saturation of the iron circuits which form part of the self-inductions present inside the appliance, upon the circuit configuration of the elements located inside the appliance and upon the existing network configuration.

Generally speaking the frequency of such phenomena is greater than the network frequency so that, in order to easily be able to intercept such phenomena, it is recommended in the case of frequencies which deviate from the network frequency that a lower safety level is selected.

In this circuit, known form US-A-4.095.163 no account is taken of the influence of the network configuration (and neither with the impedance of the appliance to be protected) which impedances have mainly an inductive character.

The present invention aims to reduce the influence of the impedance of the appliance and of the network.

Consequently the present invention provides an apparatus for protection of an electric appliance, characterised by a series circuit of two elements with a voltage dependant impedance, a capacitor connected in parallel to one of said elements.

By offering more degrees of freedom to the dimensionning, the impedance (inductance) of the network and of the appliance to be protected can be taken into account, reducing the influence thereof.

The present invention will be further explained hereinafter with reference to the appended drawings, in which.

Figure 1:
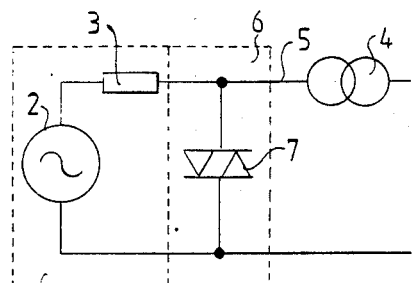
FIG. 1 shows a diagram of a known, classic protective circuit.

FIG. 1 shows in schematic form a network 1 represented by a voltage source 2 and an impedance 3. This network is linked by means of a voltage supply wire to a transformer 4. In order to protect transformer 4 against overvoltage originating from network 1, an overvoltage protective circuit 6 is arranged between network 1 and transformer 4. This known overvoltage protective circuit 6 is formed by a voltage-dependent resistance, in this case a varistor 7. This varistor 7 is dimensioned such that when the safety voltage level of varistor 7 is exceeded it will begin to conduct, so that a voltage peak exceeding the safety voltage level of transformer 4 is diverted to earth through varistor 7.

The limitations of this circuit have been discussed in the introduction.

Figure 2:
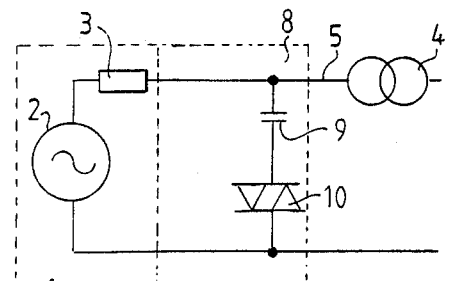
FIG. 2 shows a diagram of another known protective circuit.

In order to prevent these problems the present invention provides a frequency-dependent overvoltage protective device, an embodiment of which is shown in FIG. 2. The embodiment shown here of the overvoltage protective circuit 8 according to the current invention is in this case again connected between a network 1, represented by the combination of a voltage source 2 and an impedance 3, and a transformer 4.

This overvoltage protective circuit 8 is formed by a series connection of a capacitor 9 and a varistor 10 circuited between the voltage supply wire 5 and earth.

Capacitor 9 and varistor 10 are dimensioned such that the operation of this overvoltage protective circuit 8 is the same in the case of network frequency as that of the known overvoltage protective circuit 6 in accordance with FIG. 1. At higher frequencies the impedance of the capacitor 9 will however diminish, so that the voltage over the varistor 10 becomes greater. This has the consequence that the safety voltage level of varistor 10 is already reached at a lower working voltage than is the case at the network frequency.

No account is taken in this circuit with the impedance 3 of the network (and the appliance to be protected), this impedance generally having an inductive character.

This impedance will tend to disturb the required frequency-dependent nature of the circuit.

Figure 3:
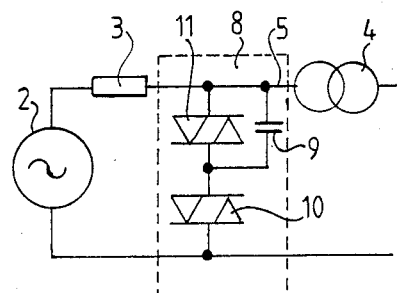
FIG. 3 shows a diagram of a first protective circuit according to the current invention.

The circuit according to the present invention shown in FIG. 3 aims to lessen the influence of the network impedance on the operation of the circuit. This circuit comprises two varistors 10, 11 connected in series, whereby a capacitor 9 is connected in parallel to varistor 11. Account is taken in the dimensioning of this circuit of the impedance (inductance) of the network so that the desired characteristic can be approached. Varistors 10 and 11 will ensure protection at the normal network frequencies, while in the case of higher frequencies, as a consequence of capacitor 9, the voltage over the varistor 10 increases so that then this element alone takes over the protection. The operation of this circuit is still however to some extent dependent on the (variable) impedance of the network and the appliance to be protected.

Figure 4:
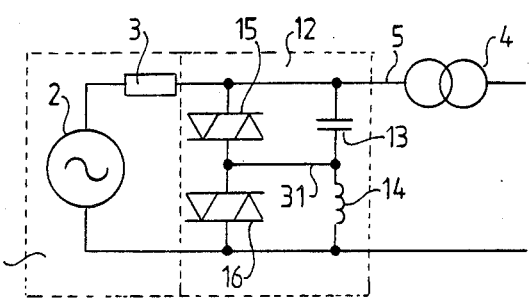
FIG. 4 shows a diagram of a second protective circuit according to the current invention.

FIG. 4 shows a second overvoltage protective circuit according to the present invention. This overvoltage protective circuit 12 is again connected between a network 1 and a transformer 4. Overvoltage protective circuit 12 is formed by a series connection of a capacitor 13 and an inductance 14. Connected in parallel to capacitor 13 as well as to inductance 14 is a varistor 15 and 16 respectively. In this circuit the influence of the impedance of the network and of the appliance to be protected is virtually eliminated, since these impedances are small relative to the inductance 14.

The operation of this circuit is likewise based on the fact that the voltage over the capacitor decreases with the frequency and also on the fact that the voltage over the inductance increases with the frequency. By making a suitable choice of the relevant varistors the safety voltage level of the protective device is fixed. Account must of course be taken here of the fact that the safety voltage level in the network frequency corresponds with the safety voltage level of the circuit shown in FIG. 1.

It is also possible through use of for instance a switch to make the safety voltage level adjustable. In this way, when the protective circuit is installed, the safety voltage level can be set to the value most appropriate in this situation.

This circuit has the further advantage over the circuits shown in FIG. 3 that because of the greater number of components the number of degrees of freedom in the choice of the desired frequency characteristic is greater. Account must of course be taken here of the fact that there is not an entirely free choice of the values of the capacitor and the inductance, since the reactive power input and output of this circuit has to be taken into account. The lowest possible resonant frequency of the series connection of the capacitor and the inductance may be selected so that the safety voltage level falls steeply above the network frequency.

Figure 5:
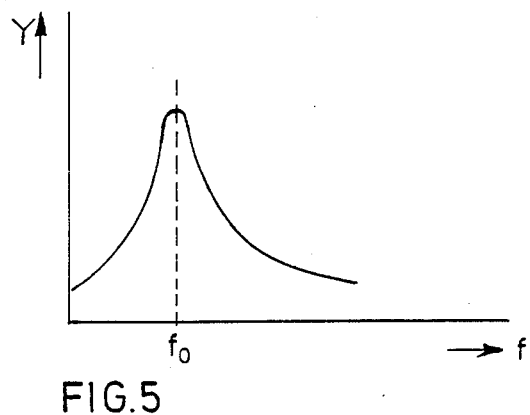
FIG. 5 is a graph by way of elucidating the invention.

FIG. 5 shows a graph of the admittance of the circuit as in FIG. 4, whereby Y = admittance, f = frequency and $f_o$ = resonant frequency of L-C series circuit.

Figure 6:
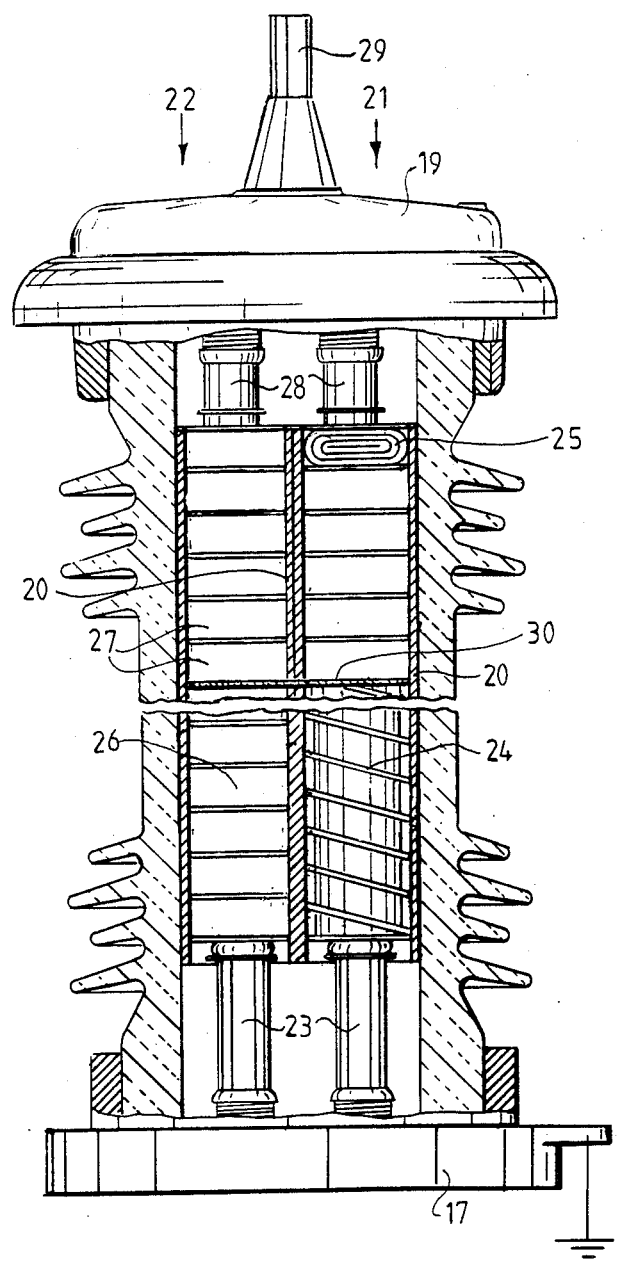
FIG. 6 shows an embodiment of the present invention.

FIG. 6 shows an embodiment of the overvoltage protective circuit shown in FIG. 4. This overvoltage protective circuit is formed by an insulating housing 18 placed on a metal foot 17, the housing being closed off at the top by a metal cover 19. Arranged in housing 18 are two column-shaped spaces 21, 22 each surrounded by an insulating casing 20. Mounted beneath each of these columns 21, 22 is a spiral spring 23 provided with a casing. Fitted onto one of the spiral springs 23 in the column 21 is a coil 24 which represents the inductance 14. A succession of capacitors 25 connected in series are arranged above coil 24. These capacitors represent the capacitance 13.

Fitted in the other column 22 above the other spiral spring 23 is a stack of varistors 26. This stack of varistors 26 represents the varistor 16. A second stack of varistors 27 is arranged above the stack of varistors 26. This second stack of varistors represents the varistor 15.

Arranged between coil 24 and the stack of capacitors 25 and between the two stacks of varistors 26, 27 is a conducting plate 30 which represents the cross connection 31 in FIG. 4. Mounted above the second stack of varistors 27 as well as above the stack of capacitors 25 is again a spiral spring 28. Spiral springs 28 and 33 retain the stacks of varistors, capacitors and the coil and fix them in their correct position. The spiral springs also serve as conductor so that the underside of the relevant stack is connected to the foot 17 and the upper end to the cover 19. Arranged on top of cover 19 is a connection 29.

The circuit shown in FIG. 4 need not of course be embodied in this manner, many other embodiments being possible.

I claim:

1. Apparatus for protecting an electrical appliance against supply overvoltage and against internal resonance overvoltage phenomena which comprises an asymmetrical impedance/capacitive electrical circuit which comprises a first conductor extending from a supply voltage network and the electrical appliance and a second conductor extending from the electrical appliance back to the supply voltage network, a series connection of two voltage-dependent impedance means connected across the first and second conductors for establishing a safety voltage level to protect the electrical appliance against said supply overvoltage and defining a junction between such two voltage-dependent impedance means, and capacitor means connected in parallel with only one of said voltage-dependent impedance means for protecting, in conjunction with the other of said voltage-dependent impedance means, against said internal resonance overvoltage phenomena.

2. Apparatus as claimed in claim 1 wherein an inductance is connected between said junction and the other of said conductors in parallel to the other voltage-dependent impedance means.

3. Apparatus as claimed in claim 1 including means for adjusting said safety voltage level.

4. Apparatus as claimed in claim 1 wherein the two voltage-dependent impedance means are formed by varistors.

5. Apparatus as claimed in claim 1 wherein all elements of said asymmetrical impedance/capacitive electrical circuit are placed in one housing.

6. Apparatus as claimed in claim 2 including means for adjusting the safety voltage level.

7. Apparatus as claimed in claim 2 wherein said voltage-dependent impedance means are formed by varistors.

8. Apparatus as claimed in claim 3 wherein said voltage-dependent impedance means are formed by varistors.

9. Apparatus as defined in claim 2 including a housing, said asymmetrical impedance/capacitive electrical circuit being disposed in the housing.

10. Apparatus as defined in claim 3 including a housing, said asymmetrical impedance/capacitive electrical circuit being disposed in the housing.

11. Apparatus as defined in claim 4 including a housing, said asymmetrical impedance/capacitive electrical circuit being disposed in the housing.

12. A frequency-dependent overvoltage protection network having input means for connection to a voltage source of predetermined frequency and output means for connection to an electrical appliance propense to internal generation of resonance at frequencies above said predetermined frequency, comprising a plurality of elements, each exhibiting a voltage-dependent impedance, and connected in series across the input and output means to provide a predetermined first safety voltage level between the input and output means at the predetermined frequency and defining a junction between the elements spaced from both the input and the output means, and capacitance means having a value such that its impedance diminishes for frequencies above said predetermined frequency, said junction being connected through said capacitance means to only one of said input and output means for providing a second safety voltage level between said input and output means which decreases relative to said first safety voltage level for said frequencies above the predetermined frequency.

13. A frequency-dependent overvoltage protection circuit as defined in claim 12 including inductance means in series with the capacitance means across the input and output means, the values of the capacitance and inductance means being chosen so that the safety voltage level falls steeply above of the predetermined frequency.

14. A frequency-dependent overvoltage protection network as defined in claim 12 wherein said input means comprises a first conductor and a ground conductor and said output means comprises said first conductor and said ground conductor.

15. A frequency-dependent overvoltage protection system comprising the combination of a voltage supply network having a first impedance and providing voltage supply at a supply frequency, an electrical appliance having a second impedance, and an electrically asymmetrical frequency-dependent overvoltage protection circuit connected between the supply network and the electrical appliance; said circuit comprising a first voltage-dependent impedance means and capacitance means in parallel therewith, and a second voltage-dependent impedance means connected in series with said first voltage-dependent impedance means whereby the circuit is electrically asymmetrical by virtue of the series connection of the voltage-dependent impedance means and the parallel connection of said capacitance means only with said first voltage-dependent impedance means so that the series connection establishes a first safety voltage limit at said supply frequency and said capacitance means and said second voltage-dependent impedance means cooperate to establish a further safety voltage limit which decreases rapidly with respect to said first safety voltage limit at resonant frequencies, due to said first and second impedances, higher than said supply frequency.

16. A frequency-dependent overvoltage protection system as defined in claim 15 wherein said electrical appliance is a transformer and said second impedance is the inductance of said transformer.

17. A frequency-dependent overvoltage protection system as defined in claim 16 wherein said circuit also includes an inductance in parallel only with said second voltage-dependent impedance means.

18. A frequency-dependent overvoltage protection system as defined in claim 15 wherein said circuit also includes an inductance in parallel only with said second voltage-dependent impedance means.

19. A frequency-dependent overvoltage protection system as defined in claim 18 wherein the impedance values of said first and second impedances are very small relative to that of said inductance.

20. A frequency-dependent overvoltage protection system as defined in claim 19 wherein the lowest possible resonant frequency of the series connection of the capacitance means and the second voltage-dependent impedance means is selected so that said further safety voltage level falls steeply above said supply frequency.

* * * * *